United States Patent
Rocheleau

(10) Patent No.: US 6,742,816 B2
(45) Date of Patent: Jun. 1, 2004

(54) PIPE FLANGE AND PIPING SYSTEM

(75) Inventor: John W. Rocheleau, Concord, NH (US)

(73) Assignee: Taco, Inc., Cranston, RI (US)

(*) Notice: Subject to any disclaimer, the term of this patent is extended or adjusted under 35 U.S.C. 154(b) by 0 days.

(21) Appl. No.: 09/764,473

(22) Filed: Jan. 17, 2001

(65) Prior Publication Data

US 2001/0001524 A1 May 24, 2001

Related U.S. Application Data

(63) Continuation of application No. 09/179,584, filed on Oct. 27, 1998, now abandoned, which is a continuation-in-part of application No. 29/092,432, filed on Aug. 19, 1998, now abandoned, and a continuation-in-part of application No. 29/090,410, filed on Jul. 8, 1998, now abandoned.

(51) Int. Cl.[7] .................................. F16L 17/00
(52) U.S. Cl. ...................... 285/368; 285/405
(58) Field of Search ................ 285/405, 414, 285/412, 368, 363; 403/335, 336, 337, 338

(56) References Cited

U.S. PATENT DOCUMENTS

| 198,818 A | * | 1/1878 | Shaw | 285/412 |
|---|---|---|---|---|
| 2,151,702 A | * | 3/1939 | Ilg | 285/204 |
| 2,412,487 A | * | 12/1946 | Amley et al. | 403/337 |
| 3,921,673 A | * | 11/1975 | Pero | 138/109 |
| 3,998,477 A | * | 12/1976 | Delahaye et al. | 285/368 |
| 5,133,642 A | * | 7/1992 | Kajiwara | 285/412 |
| 5,271,685 A | * | 12/1993 | Stark | 403/337 |

\* cited by examiner

*Primary Examiner*—Lynne H. Browne
*Assistant Examiner*—Aaron Dunwoody
(74) *Attorney, Agent, or Firm*—Barry G. Magidoff

(57) ABSTRACT

A threaded pipe flange and piping system utilizing the same. The threaded pipe flange includes a base portion having a predetermined shape and at least two openings dimensioned to accept at least two mounting bolts. A shoulder portion extends from, and is integral to, the base portion and includes at least two substantially flat gripping surfaces that allow the flange to be attached using an open end wrench, adjustable wrench or pipe wrench. A threaded opening extends through the base portion and the shoulder portion and is sized to mate with the threaded pipe to which the flange is to be attached. In operation, the pipe flange is attached to the predetermined threaded pipe by aligning the threaded opening with the predetermined threaded pipe, gripping the gripping surfaces of the shoulder portion, and rotating the pipe flange until the flange is tight. The piping system includes at least one threaded pipe, a pipe flange having a plurality of gripping surfaces, a pair of mounting bolts and a circulator or other pump.

7 Claims, 5 Drawing Sheets

PIPE FLANGE AND PIPING SYSTEM

RELATED APPLICATIONS

This is a continuation of U.S. patent application Ser. No. 09/179,584, filed Oct. 27, 1998, now abandoned which is continuation-in-part of U.S. Design patent application Ser. Nos. 29/092,437, filed Aug. 19, 1998, now abandoned and 29/090,410, filed Jul. 8, 1998, now abandoned.

FIELD OF THE INVENTION

The present invention relates to the field of plumbing and heating and, in particular, to a flange for connection to a water circulator or pump and to a piping system utilizing the same.

BACKGROUND OF THE INVENTION

Flanges are typically used to connect pumps or flow controlling devices to a pipe, or to connect a pipe to another pipe directly. Connections of this type are used extensively in the plumbing and heating industry, especially with steel or copper pipes.

Flanges are secured to pipe ends by means of interior flange threads rotated to attach to the exterior pipe threads. The force required to attach the flange to the pipe is substantial and a typical flange will not have a shoulder that is used that is designed to serve as a gripping surface for tightening the flange. The absence of this shoulder necessitates the use of a large pipe wrench to attach the flange to the exterior pipe threads. As the surrounding free space is usually obstructed and quite small, it is often difficult for a user to maneuver the wrench. In addition, the size and shape of the gripping surface may also vary as the flange is turned onto the pipe, thus necessitating the use of more than one wrench. For these reasons, pipe flanges are well known as fittings that present a fastening problem.

One particularly common problem is encountered when attaching pipe flanges to pipe ends for connection to circulators, such as those utilized in home heating systems. These flanges are typically elliptical in shape and do not readily accommodate a standard pipe wrench or other tightening device. In addition, when the elliptical ends of the flange have turned within the 180 degrees tightening arc, the wrench must be readjusted, necessitating many fatiguing and time consuming iterations to complete the task. Moreover, as the size of a pipe wrench increases, the length of the handle increases proportionally. As pipe flanges must often be attached to a circulator that is extremely close to a wall, other pipes, or even worse, a corner, the use of a long handled pipe wrench or a pry-bar and long stove bolts to attach the flange to the pipe makes this job a tiring and time consuming one.

One solution to this problem is disclosed in the inventor's co-pending U.S. patent application Ser. No. 08/897,741, titled FLANGE TIGHTENING TOOL. This application discloses a flange tightening tool for use in securing a standard flange to a pipe. The tool has a base plate, a tightening hexagonal shoulder, two attachment openings, and a rotating handle perpendicular to the tightening base plate. The base plate and openings are dimensioned to mate with the flange to be tightened and the rotatable handle is attached to hexagonal shoulder and can be used to position the tool against the flange. In operation, the user positions the tool against the flange, attaches the tool to the flange by inserting bolts through the openings in the base plate, and attaches the flange to the pipe by gripping and rotating the hexagonal shoulder with an appropriately sized box or adjustable type wrench.

The inventor's co-pending application has many advantages over the current flange tightening methods. It eliminates the gripping problems associated with standard pipe flanges by gripping the flange at the mating surface rather than the shoulder. In addition, box or adjustable wrenches having appropriately sized handles may be utilized rather than the long handles associated with larger sized pipe wrenches. Despite these advantages, this solution has not gained acceptance due to the cost of the tool and the reluctance of installers to adapt their methods to new technologies.

Therefore, there is a need for a means for attaching a pipe flange to a pipe that may be utilized to install the flange adjacent to an existing circulator or other device, that may be utilized in close quarters, and that allows an installer to utilize a standard open end or adjustable wrench, and that does not require an installer to purchase a new tool or to alter accepted installation methods.

SUMMARY OF THE INVENTION

The present invention is a threaded pipe flange and piping system utilizing the same. In its most basic embodiment, the threaded pipe flange includes a base portion having a predetermined shape and at least two openings dimensioned to accept at least two mounting bolts. A shoulder portion extends from the base portion and includes at least two substantially flat gripping surfaces that allow the flange to be attached using an open end wrench, adjustable wrench or pipe wrench. A threaded opening extends through the base portion and the shoulder portion and is sized to mate with the threaded pipe to which the flange is to be attached. In operation, the pipe flange is attached to the predetermined threaded pipe by aligning the threaded opening with the predetermined threaded pipe, gripping the gripping surfaces of the shoulder portion, and rotating the pipe flange until the flange is tight.

The pipe flange may have any number of gripping surfaces, though it is preferred that it have between four and eight gripping surfaces. The preferred pipe flange is elliptical in shape and is made from malleable iron, though other shapes and materials, including ductile iron, steel or brass, may also be utilized depending upon the application in which the flange will be utilized.

In its most basic embodiment, the piping system of the present invention includes at least one threaded pipe, a pipe flange as described above, a pair of mounting bolts and a circulator or other pump. The circulator is made up of a pump portion and a volute portion through which the fluid is pumped. The volute portion includes at least one volute flange that is dimensioned to mate with the pipe flange. In some embodiments, the volute flange includes a substantially flat mounting surface, while in others the mounting surface includes a recessed portion that is dimensioned to accept a circular gasket.

In this system, the pipe flange is attached to the threaded pipe by aligning the threaded opening with the predetermined threaded pipe, gripping the gripping surfaces of the shoulder portion, and rotating the pipe flange. The pipe flange is attached to the circulator by aligning the pipe flange openings with the volute flange openings and disposing and securing the bolts through the pipe flange and the volute flange such that the pipe flange and the circulator are tightened together.

The piping system may include a gasket disposed between the pipe flange and the volute flange, with the preferred system having a recess in mounting surface of the volute flange to accept a round gasket. However, in some embodiments, traditional gaskets that are dimensioned to have the same footprint as the pipe flange are utilized, while in still others, other known sealing methods are employed.

Therefore, it is an aspect of the invention to provide a pipe flange that may be utilized to install a flange adjacent to an existing circulator or other device.

It is a further aspect of the invention to provide a pipe flange that may be easily installed in close quarters.

It is a further aspect of the invention to provide a pipe flange that allows an installer to utilize a standard open end wrench or adjustable wrench during installation.

It is a further aspect of the invention to provide a pipe flange that does not require a special tool to install and does not require installers to depart from accepted installation methods.

It is a still further aspect of the invention to provide a piping system in which a pipe flange may be easily attached to a circulator regardless of the location of the circulator in relation to walls, pipes or other devices.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
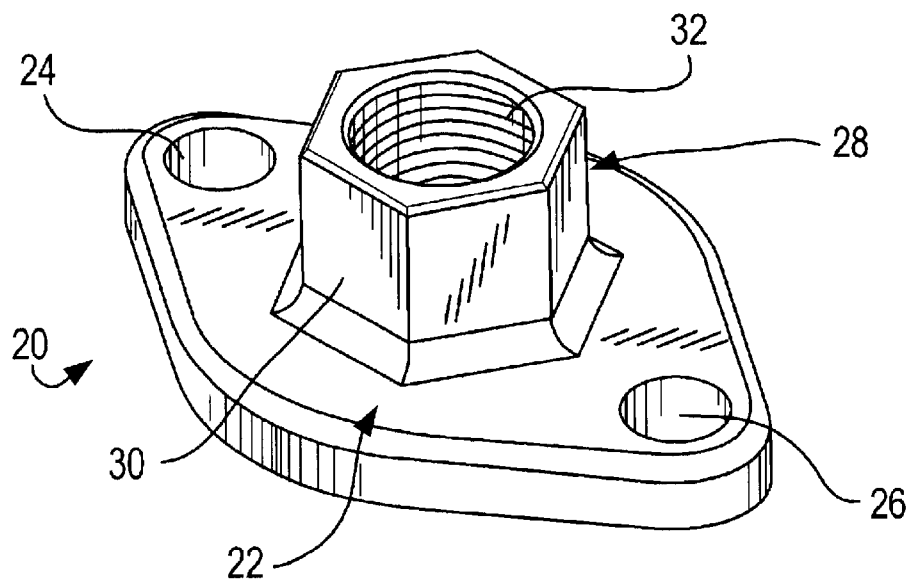
FIG. 1 is an isometric view of one embodiment of an elliptical pipe flange of the present invention.

Referring first to FIG. 1, one embodiment of the threaded pipe flange in accordance with the present invention is shown. In this embodiment, threaded pipe flange 20 includes a base portion 22 having an elliptical shape and least two openings 24, 26 that extend through the base portion 22. Each of the openings 24, 26 has a diameter that corresponds to the diameter of the mounting bolts (not shown) used to secure the pipe flange 20 to a mating flange. Shoulder portion 28 extends substantially perpendicularly from the base portion 22. In this embodiment, shoulder portion 28 includes six substantially flat gripping surfaces 30 disposed such that the shoulder portion 28 forms a hexagon. The inclusion of a plurality of gripping surfaces 30 allows the flange to be installed utilizing a standard open end or adjustable wrench instead of the pipe wrenches typically used. A threaded opening 32 extends through said base portion 22 and said shoulder portion 28. Threaded opening 32 has a predetermined diameter and thread size to correspond to the pipe (not shown) to which it the pipe flange 20 is to be attached.

Figure 2:
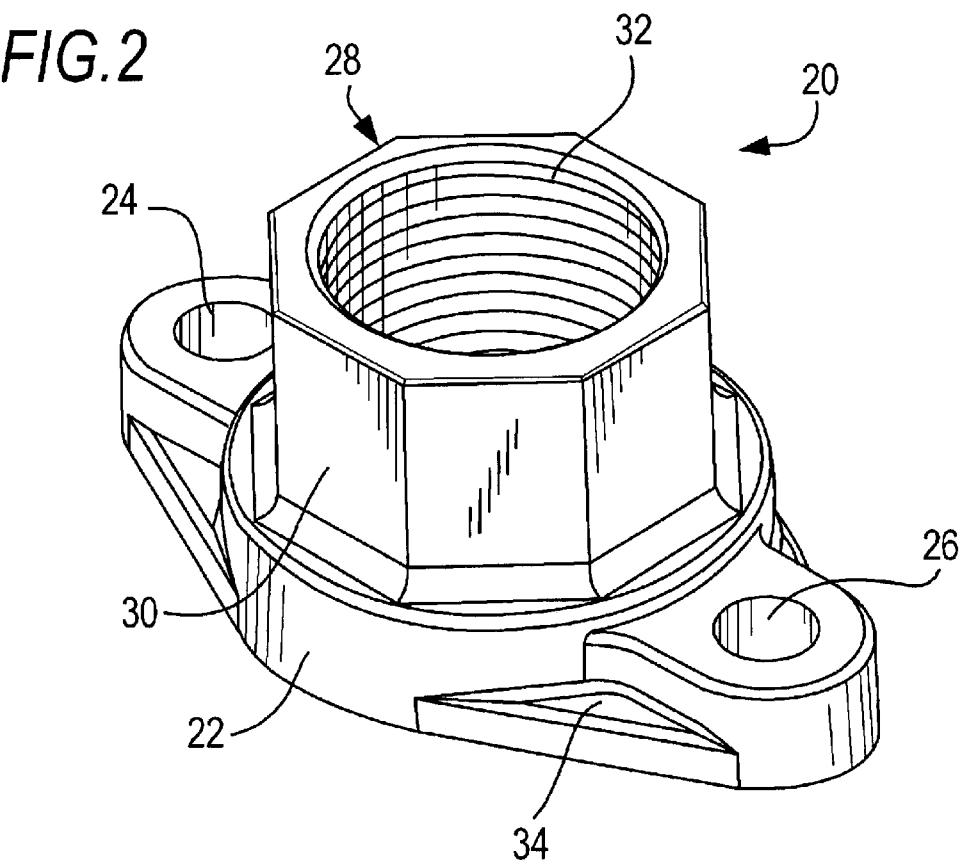
FIG. 2 is an isometric view of another embodiment of an elliptical pipe flange of the present invention.

Referring now to FIG. 2, another embodiment of the pipe flange 20 of the present invention is shown. As was the case with the embodiment of FIG. 1, this embodiment includes an elliptical base portion 22 having two openings 24, 26. However, the shoulder portion 28 of this embodiment includes eight gripping portions 30, rather than the six shown in FIG. 1, such that the shoulder portion 28 forms an octagon. In addition, in this embodiment, thinned portions 34 are included around the openings 24, 26 to reduce the weight of the flange 20. It is recognized that these thinned portions 34 may be utilized about the openings in any of the described embodiments having elliptical base portions 22 to achieve similar results.

Figure 3:
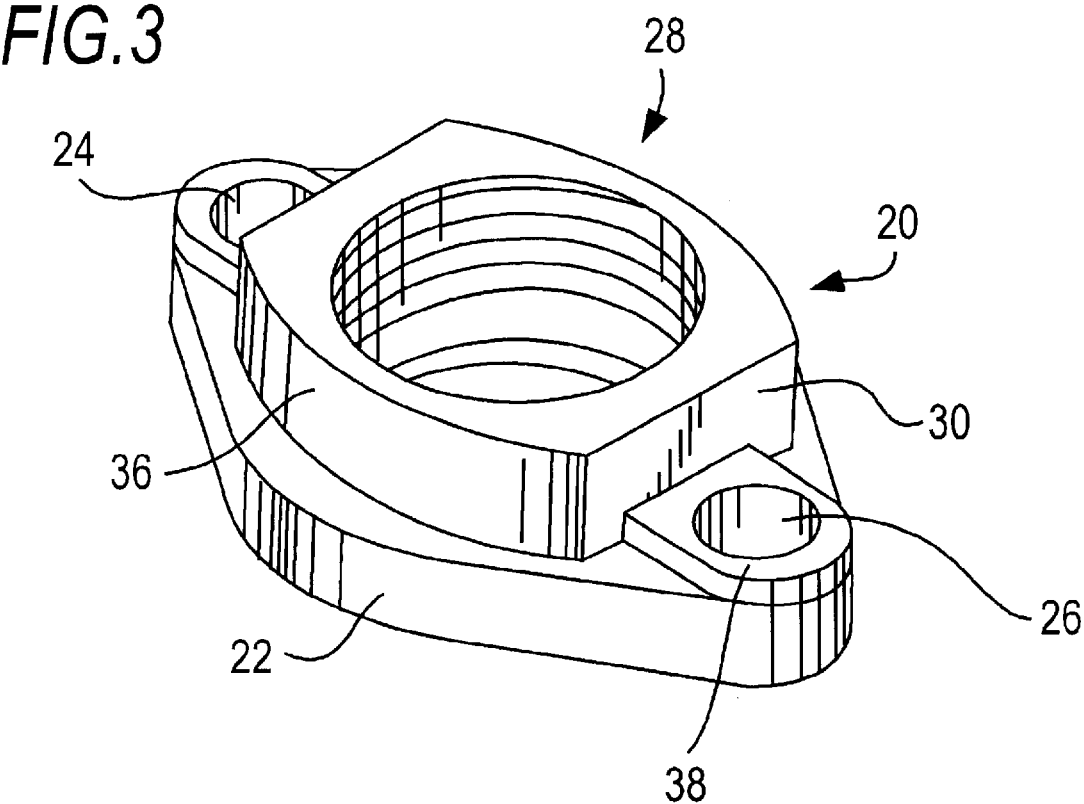
FIG. 3 is an isometric view of another embodiment of an elliptical pipe flange of the present invention.
Figure 4:
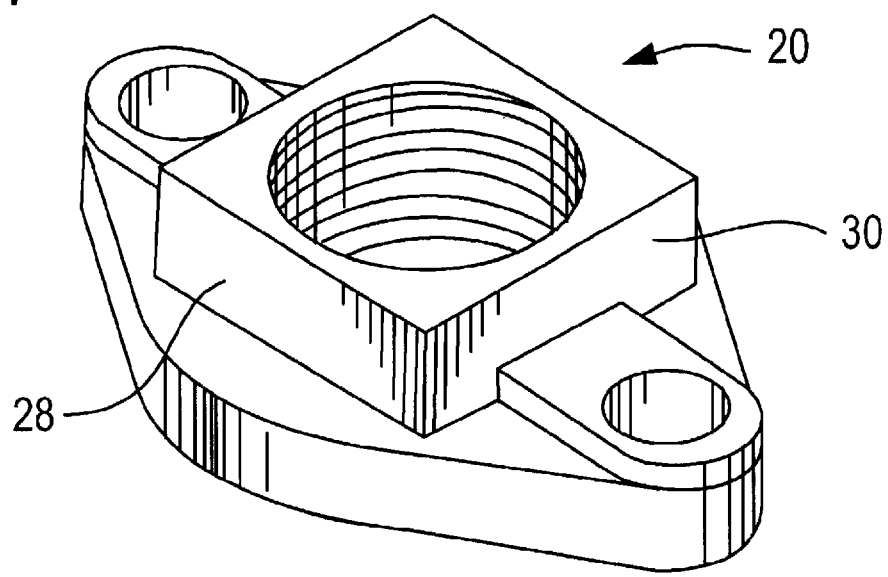
FIG. 4 is an isometric view of another embodiment of an elliptical pipe flange of the present invention.

Referring now to FIG. 3, still another embodiment of the pipe flange 20 of the present invention is shown. This embodiment includes an elliptical base portion 22 and two openings 24, 26. The shoulder portion 28 of this embodiment includes two substantially parallel gripping surfaces 30 and a pair of opposed curved portions 36 between each gripping surface 30. In addition, the base portion 22 includes a pair of raised areas 38 about the openings 24, 26 to increase the rigidity of the surfaces in contact with the bolts. It is recognized that these raised areas 38 may be utilized about the openings in any of the described embodiments to achieve similar results Referring now to FIG. 4, still another embodiment of the pipe flange 20 of the present invention is shown. The embodiment of FIG. 4 is substantially the same as the embodiment of FIG. 3 except that the shoulder portion 28 includes four gripping surfaces 30 instead of two. Here, the curved portions 36 are replaced by gripping surfaces 30 such that the shoulder portion 28 forms a square.

Figure 5:
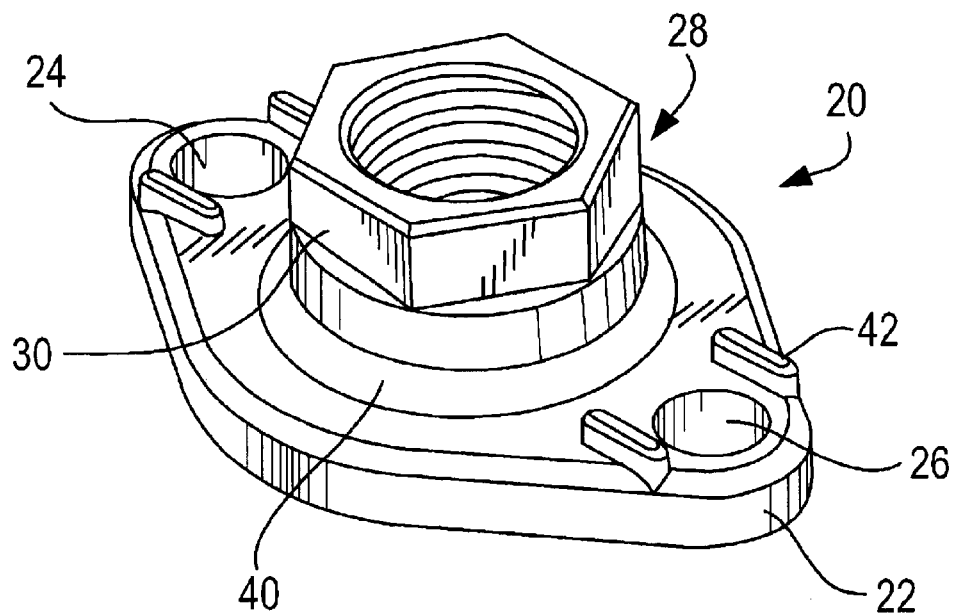
FIG. 5 is an isometric view of another embodiment of an elliptical pipe flange of the present invention.

Referring now to FIG. 5, still another embodiment of the pipe flange 20 of the present invention is shown. As was the case with the embodiments of FIGS. 1–4, this embodiment includes an elliptical base portion 22 having two openings 24, 26. However, the shoulder portion 28 of this embodiment includes a substantially cylindrical spacer portion 40 disposed between the base portion and the gripping surfaces 30. Though FIG. 5 shows a shoulder portion 28 having a spacer portion 40 and six gripping surfaces 30, it is understood that shoulder portions 28 having two, four, eight or ten gripping surfaces 30 may be substituted to achieve similar results. FIG. 5 also includes bolt retainers 42 disposed about the openings 24, 26 in base portion 22. These bolt retainers 42 act to hold the bolt (not shown) in place while a nut (also not shown) is tightened to fasten the pipe flange 20 to a mating flange. It is recognized that these bolt retainers 42 may be utilized about the openings in any of the described embodiments to achieve similar results.

Figure 6:
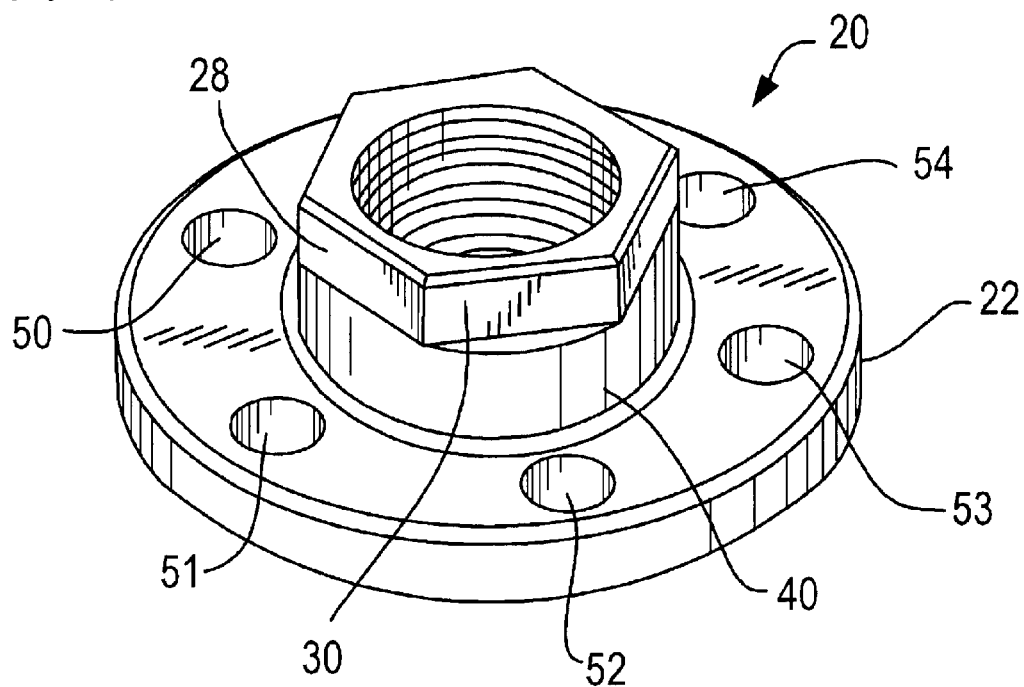
FIG. 6 is an isometric view of one embodiment of a circular pipe flange of the present invention.

Referring now to FIG. 6, still another embodiment of the pipe flange 20 of the present invention is shown. This embodiment includes a shoulder portion 28 having a substantially cylindrical spacer portion 40 disposed between the base portion and the gripping surfaces 30. Here, the base portion 22 is round and includes six openings 50–54, disposed substantially radially about the shoulder portion 28. However, it is recognized that pipe flanges 20 having round base portions 22 with four or more openings and shoulder portions 28 without spacer portions 40 may be substituted to achieve similar results.

Figure 7:
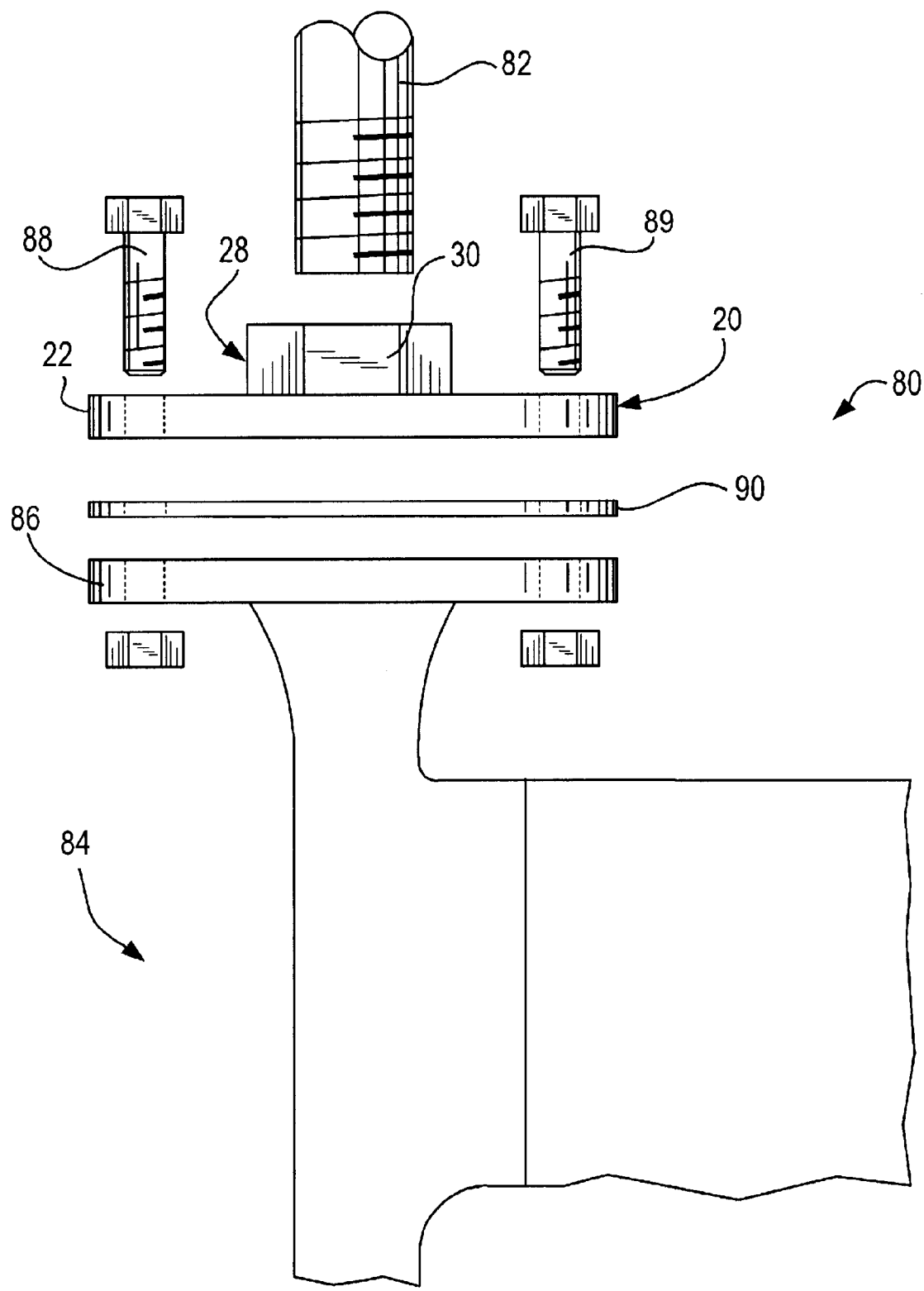
FIG. 7 is an exploded diagrammatic view of the piping system of the present invention.

Referring next to FIG. 7, an exploded diagrammatic view of the piping system 80 of the present invention is shown. Piping system 80 includes threaded pipe 82, pipe flange 20, a circulator, or other pump, 84 having a volute flange 86, mounting bolts 88, 89 and gasket 90. An installer would attach the system together in the arrangement shown in this figure. The pipe flange 20 is threaded onto the threaded pipe 82 utilizing an open end or adjustable wrench and the gripping surfaces 30 of the shoulder portion 28 of pipe flange 20. The circulator 84 is disposed such that the volute flange 86 is adjacent to the base portion 22 of pipe flange 20. Gasket 90 is then positioned between pipe flange 20 and volute flange 86 and mounting bolts 88, 89 are passed through the openings in pipe flange 20 and volute flange 86 and secured.

Threaded pipe 82 is typically threaded steel or brass pipe, or is copper pipe with a threaded fitting soldered to the end to be mated with the pipe flange 20. However, any type of pipe commonly used in the plumbing and heating trades may be utilized.

Pipe flange 20 may be any of the embodiments described in FIGS. 1–6. It is preferred that pipe flange 20 be made of malleable iron, ductile iron, brass or steel, as the mechanical properties of these materials are such that the forces generated upon the gripping surfaces 30 do not cause the shoulder portion 28 to fail during installation. However, other materials having sufficient strength to withstand installation and removal of the pipe flange 20 may also be utilized.

Gasket 90 may be a round gasket or may be shaped in the same configuration as the base portion 22 of the pipe flange 20. In the preferred embodiment, gasket 90 is manufactured from a hard rubber, but in other embodiments, gaskets manufactured from TEFLON®, NEOPRENE®, or cork may be utilized to achieve similar results.

Circulator 84 may be any commonly used circulator or water pump. Circulator 84 includes the pump, or cartridge, portion and a volute portion having at least one volute flange 86. In the preferred embodiment, circulator is an "00" series circulator manufactured by Taco, Inc. of Cranston, R.I. or a "Brute" series circulator manufactured by Grundfos, Inc. of Clovis, Calif.

Figure 8:
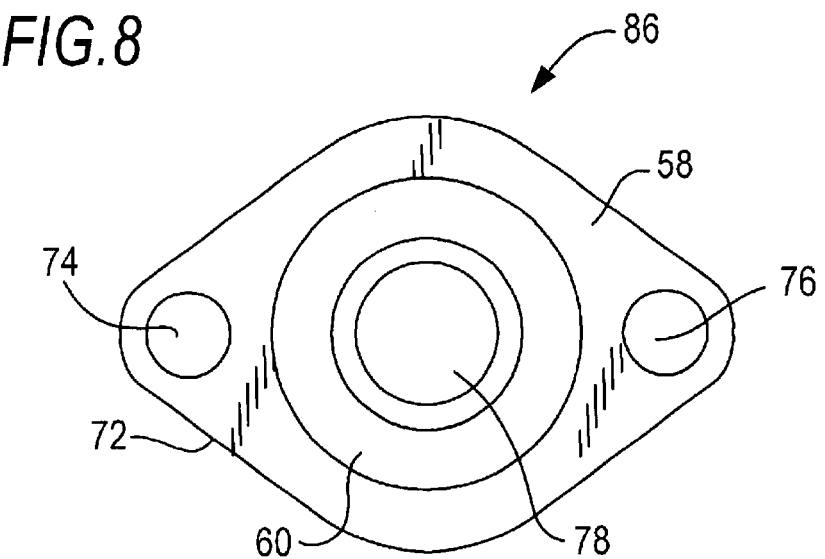
FIG. 8 is a bottom view of one embodiment of the mounting surface of an elliptical volute flange of the present invention.
Figure 9:
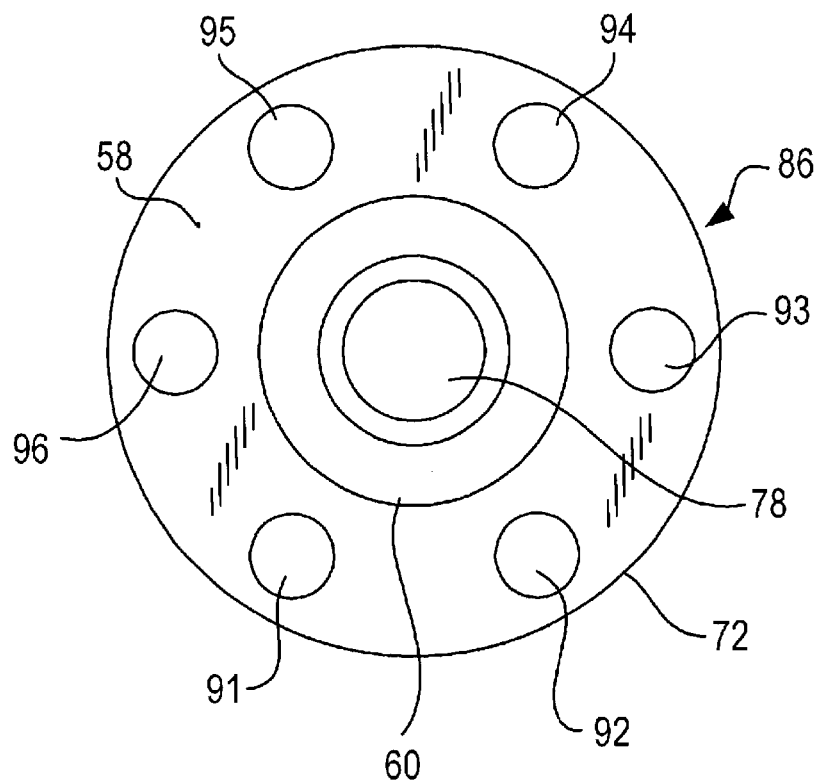
FIG. 9 is a bottom view of one embodiment of the mounting surface of a circular volute flange of the present invention.

Referring now to FIGS. 8 & 9, bottom views of volute flanges 86 having elliptical and circular base portions 72, are respectively shown. Base portions 72 have substantially flat bottoms 58 that are broken by the bolt openings, 74, 76 and 91–96, and volute openings 78. In these embodiments, substantially round recessed portions 60 are disposed about the volute openings 78 to permit round gaskets (not shown) to be retained about the volute openings 78. Recessed portions 60 are dimensioned to allow the gasket to be retained while still being able to be compressed during installation. It is recognized, however, that the recessed portion 60 is eliminated in other embodiments with both round and elliptically shaped gaskets being used.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A threaded pipe flange consisting of:
    a base portion having a predetermined shape and at least two openings dimensioned to accept at least two mounting bolts;
    a shoulder portion extending from and integral to said base portion, said shoulder portion having at least two substantially flat gripping surfaces; and
    a threaded opening extending through said base portion and said shoulder portion, said threaded opening being dimensioned for attachment to a predetermined threaded pipe;
    wherein said pipe flange may be attached to said predetermined threaded pipe by aligning said threaded opening with said predetermined threaded pipe, gripping said gripping surfaces of said shoulder portion, and rotating said pipe flange.

2. The pipe flange as claimed in claim 1 wherein said shoulder portion has four gripping surfaces.

3. The pipe flange as claimed in claim 1 wherein said shoulder portion has six gripping surfaces.

4. The pipe flange as claimed in claim 1 wherein said shoulder portion has eight gripping surfaces.

5. The pipe flange as claimed in claim 1 wherein said base portion has an elliptical shape.

6. The pipe flange as claimed in claim 1 wherein said base portion has a round shape.

7. The pipe flange as claimed in claim 1 wherein said pipe flange is manufactured of a material selected from a group consisting of malleable iron, ductile iron, brass and steel.

* * * * *